Sept. 10, 1940.  W. E. URSCHEL  2,214,113

CORN HARVESTING APPARATUS

Filed July 16, 1938  4 Sheets-Sheet 1

INVENTOR
William E. Urschel
BY:- Cox & Moore
ATTORNEYS

Sept. 10, 1940.  W. E. URSCHEL  2,214,113
CORN HARVESTING APPARATUS
Filed July 16, 1938  4 Sheets-Sheet 2
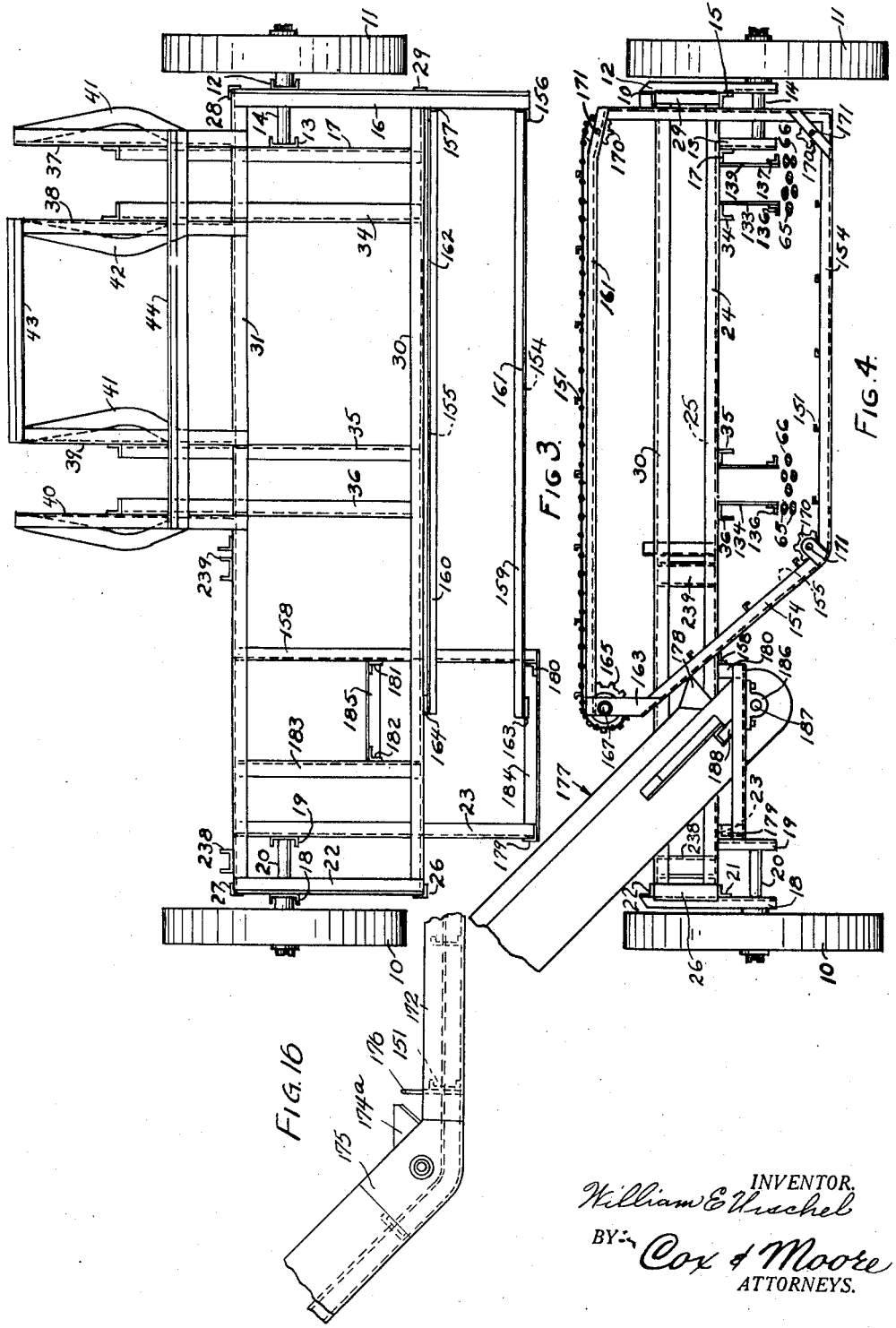

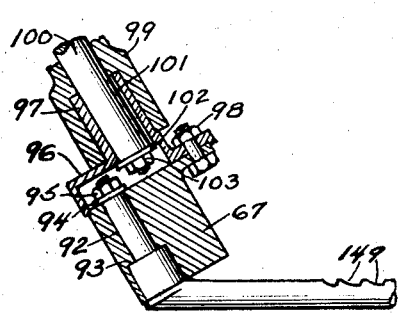
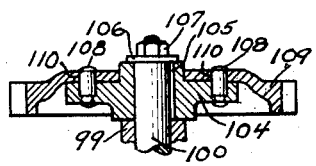
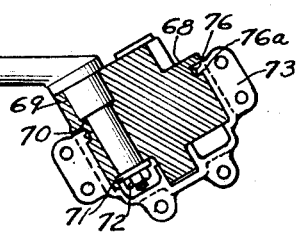
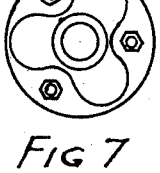
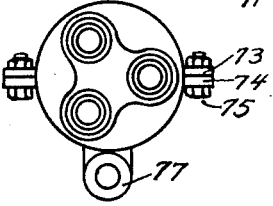
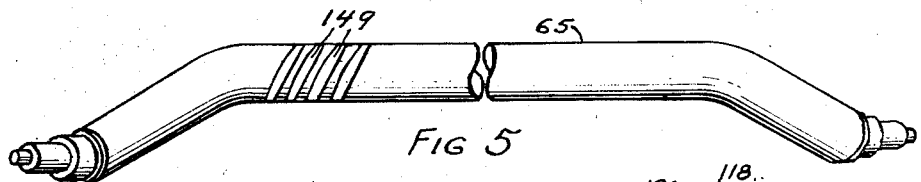
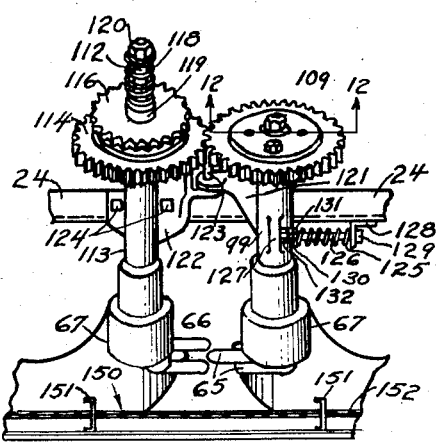
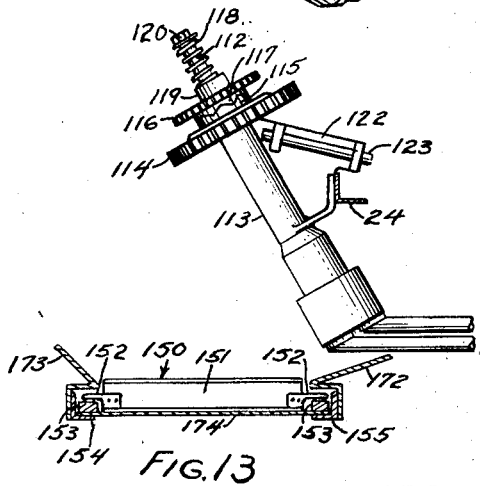

Sept. 10, 1940.  W. E. URSCHEL  2,214,113
CORN HARVESTING APPARATUS
Filed July 16, 1938  4 Sheets-Sheet 4
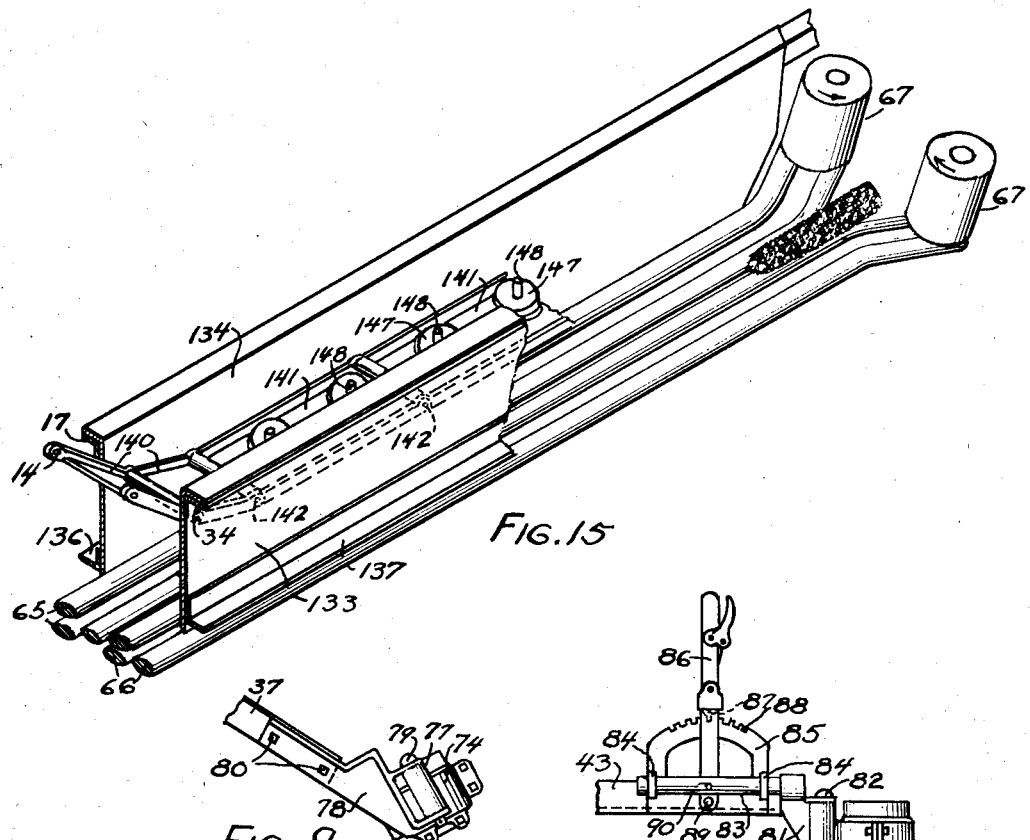
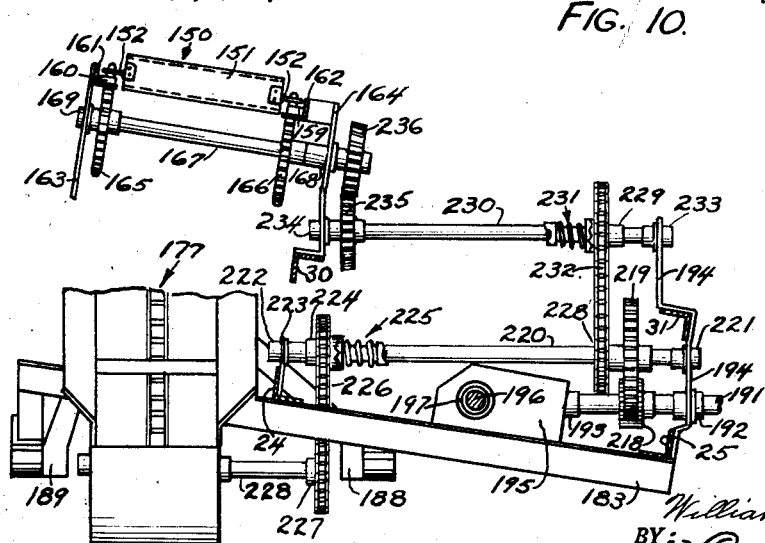
INVENTOR.
William E. Urschel
BY: Cox & Moore
ATTORNEYS.

Patented Sept. 10, 1940

2,214,113

UNITED STATES PATENT OFFICE 2,214,113

CORN HARVESTING APPARATUS

William E. Urschel, Valparaiso, Ind.

Application July 16, 1938, Serial No. 219,609

12 Claims. (Cl. 56—103)

This application is a continuation in part of applicant's copending application, Serial No. 15,735, filed April 11, 1935.

The invention relates to corn pickers and huskers. The invention has to do particularly with a type of picker and husker that is drawn along rows of corn. As it moves along such rows, it separates the ears of corn from the stalks and husks the ears, rejecting the stalks and the husks. Heretofore, it has been common practice to pick ears of corn by means of roughly ribbed or pegged rolls which possess a tendency to shell the kernels from the ears of corn. The ears, therefore, are removed from the ribbed or pegged rolls as rapidly as possible.

In the present invention, means are used to separate the ears of corn from the stalks without reliance upon a rough contoured surface for the efficient operation of the apparatus. Rather, dependence is had upon a squeezing and pulling action for stripping the ears from the stalks. It is not necessary to transfer the ears of corn immediately from the squeezing and pulling means. The smooth surface of the squeezing and pulling means and their angular disposition permit the use of a single unit for snapping the ears from stalks and for husking the separated ears without danger of undue shelling of the kernels from the ears. The herein described arrangement permits the elimination of complicated structure and drive members for an independent conveying and husking means, making the present machine less cumbersome and of less weight than earlier machines.

The presently illustrated means are highly effective for handling weedy corn. Other machines encounter difficulties in the early morning or in damp weather because weeds found in nearly all corn crops become entangled therein. Weeds cannot become entangled in the devices of the present apparatus because of their structure and smooth surfaces. The opposite is true in pickers employing ribbed or pegged rolls to snap the ears of corn from the corn stalks.

Weeds, toughened by the dampness, become entwined with the pegs or other protuberances on the snapping rolls of conventional machines until the rolls become clogged and choked, rendering them ineffective to such an extent that the rolls must be cleaned before the machine may again operate efficiently. Weeds cause great annoyance to an operator of such a machine, and often render it advisable to suspend operations until the fields are dry and hence favorable to a higher operating efficiency for the machine.

The necessity for dryness or dry weather for snapping ears from corn proves a great handicap to the user of a conventional machine for the husks may be removed from the ears of corn much more readily when damp than when dry. The capacity of the present invention to handle corn when the weeds handled along with the corn are wet greatly increases the daily output of the machine since the machine can operate efficiently at any time of the day and under all adverse weather conditions.

One object of the present invention is to provide a new and improved simple and efficient machine that may be drawn through a field of standing corn and as it goes snap the ears of corn from the stalks of a plurality of adjacent rows of corn simultaneously, leaving the picked stalks in the field.

Another object of the invention is to provide means to snap corn from stalks by a set of pinch bars and to thereafter guide and convey such corn rearwardly over the squeezing and pulling devices to remove the husks from the ears and to convey the husked ears toward the rear of the machine into a collector or into a wagon or truck loading conveyor system.

Another object of the invention is to provide a novel carrier employing the movement of squeezing and pulling means as a motive force for conveying husked ears along a path in a conveyor that elevates and deposits such ears in a suitable wagon or truck drawn alongside of the machine or in a suitable receptacle upon the picker itself.

Another object of the invention is the provision of a corn picker and husker that may be drawn by an ordinary tractor while the power for operating the several mechanisms of the picker and husker is derived directly from the power shaft of such tractor.

A further object of the invention is to provide a novel and simple mechanism for driving gathering chains, squeezing and pulling means, and elevating mechanism, and consisting of a minimum number of wearing parts.

Another object of the invention is the provision of a simple power take off and hitch universally adapted to any common type of farm tractor.

Another object of my invention is to provide a method for harvesting and husking corn from the stalk.

These objects, and others which will hereinafter appear, are obtained by the novel arrangement, combination and construction of elements hereinafter described and claimed. A machine embodying one form of the invention is illustrated in the accompanying drawings hereby made a part of this application, and in which:

Fig. 3 is a plan view of the main frame of the machine shown in Fig. 1, but reversed, with the gathering, husking, and elevator units removed.

Fig. 4 is a rear elevation of the main frame of the machine with the husking units removed.

Fig. 5 is an enlarged plan view of one of the devices shown in Figs. 1 and 2.

Fig. 6 is a view of one of the squeezing and pulling means and its bearing heads or blocks, the former being in elevation and the latter in section.

Fig. 7 is a plan view of the rear bearing head or block.

Fig. 8 is a plan view of the forward bearing head or block.

Fig. 9 is a side elevation of the holder for the forward head.

Fig. 10 is a front view of the adjustable holder for the forward bearing head.

Fig. 11 is a perspective of the squeezer or puller member drive and a fragment of the rear elevator.

Fig. 12 is a section on line 12—12 of Fig. 11.

Fig. 13 is a view of the drive bearing and of the rear elevator, the former being in elevation and the latter in section.

Fig. 14 is a vertical section of the main drive on line 14—14 in Fig. 1.

Fig. 15 is a perspective of a portion of the husking chamber, parts being broken away to illustrate details.

Fig. 16 is an enlarged side elevation of a part of the conveyor.

Like reference characters are used to designate similar parts in the drawings and in the following description.

Figure 1:
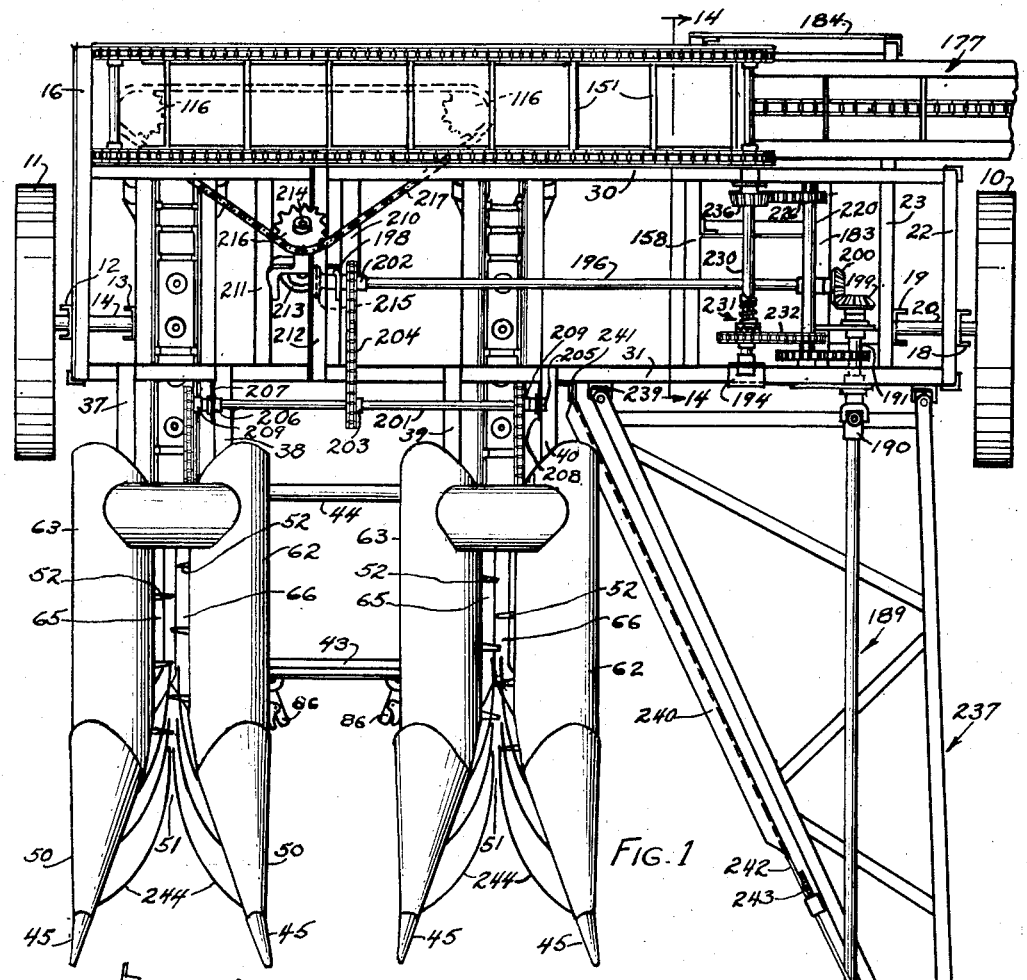
Fig. 1 is a plan view of a machine embodying the invention.
Figure 2:
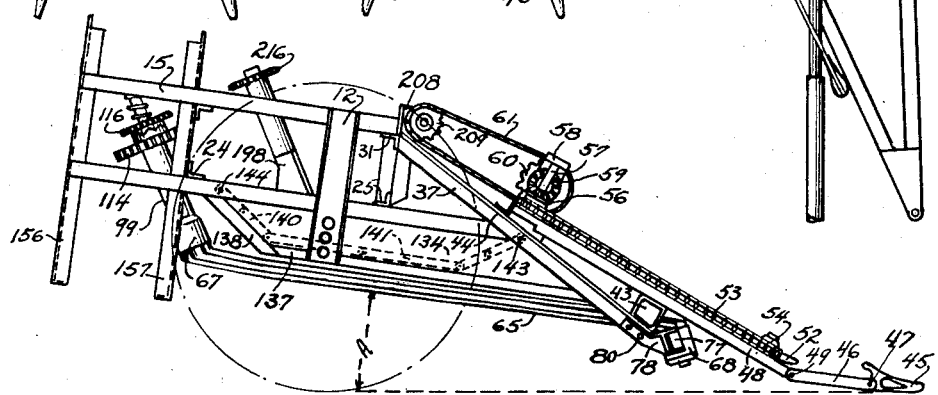
Fig. 2 is a side elevation of the machine shown in Fig. 1 on a reduced scale and with various guards and guides and the rear elevator removed to more clearly illustrate various structural features.

Figs. 1, 2, 3 and 4 illustrate a machine having a main frame disposed upon ground or supporting wheels 10 and 11. Uprights 12 and 13 have bearing boxes and an axle 14, which is the axle of wheel 11, secured in such bearing boxes. Uprights 12 and 13 are bolted or otherwise secured to longitudinal frame members 15, 16 and 17. Uprights 18 and 19 are bolted or otherwise secured to longitudinal frame members 21, 22 and 23 respectively and have bearing boxes to receive an axle 20 on which wheel 10 rotates.

Lower rear transverse frame member 24 and like front transverse member 25 are secured at their extremities to the longitudinal members 15 and 21 in any conventional manner. Corner uprights 26, 27, 28 and 29 are secured at their lower ends to members 24 and 25 (Figs. 2, 3 and 4) and serve as supports for upper transverse members 30 and 31. The extremities of members 30 and 31 are connected by longitudinal members 16 and 22. Thus a rigid box-like main frame is provided.

Longitudinal members 17, 34, 35 and 36 are secured to lower transverse members 24 and 25 and at their ends support parallel downwardly sloping longitudinal members 37, 38, 39 and 40 which they engage intermediate their ends. Members 37, 38, 39 and 40 are also secured at their upper ends to transverse member 31. Members 37, 38, 39 and 40 are reenforced against lateral displacements by angle members 41 and 42.

A transverse bracing member 43 is secured to the lower ends of members 38 and 39 to insure rigidity. A transverse member 44 is also secured to members 37, 38, 39 and 40 to maintain such members in parallel relation.

Gatherer points 45 are secured to extension brackets 46 by rivets 47 or the like. Extension brackets 46 are pivotally mounted upon the lower ends of gatherer boards 48 by means of pins 49. The gatherer boards 48 are mounted on transverse members 43 and 44. This arrangement permits of the points 45 floating over the irregular contour of the surface of the ground to pick up any stalks that may be broken or that lie on the ground. Guides 50 are riveted or otherwise secured to brackets 46 and guide corn stalks into throats 51 where the stalks are contacted by fingers 52 of gatherer chains 53. The rearmost ends of guides or shoes 50 are upwardly flared so that the shoes raise the fallen stalks picked up by the points 45 and guide such stalks into throats 51.

The lower ends of chains 53 idle on sprockets 54 secured in any conventional manner to the lower ends of gatherer boards 48. Gatherer chains 53 are driven by sprockets 55 secured to the hubs of bevel gears 56 rotatably mounted upon shafts 57. Gatherer chains 53 may be guided in predetermined paths along the gatherer boards 48 by means of hardwood guides (not shown) bolted to said boards.

The drives for right and left gatherer chains are alike. Bevel gears 59 are pinned to the extremities of transverse shaft (not shown, see Fig. 2) suitably journaled in a bracket 58. Upon said unshown shaft is also mounted, in any conventional manner, a sprocket 60 having a chain 61 thereabout to impart rotative movement to said unshown transverse shaft which unshown shaft imparts movement to shaft 57 by intermediate gears 59 and 56 and thus drives the gatherer chains 53. Curved guide plates or sheets 62 and 63 guide corn stalks into a position to be acted upon by gatherer chains 53. Other guides may be attached to guides 62 and 63 in any conventional manner to protect the gatherer drive and to guide the upper ends of the corn into the husking chamber.

Two sets of oppositely and complementally disposed means 65 and 66 (Figs. 1, 2 and 15), are used to snap the ears from the stalks. The arrangement and action of similar bars are described in detail in the United States patent to William E. Urschel, Number 1,942,011, granted January 2, 1934, entitled Mechanical movement, and reissued on October 27, 1936 as Reissue Number 20,151.

Any desired type of means may be utilized for accomplishing the results and functions of the mechanism I have herein illustrated for the purpose of pulling and squeezing corn stalks in order to strip ears of corn therefrom as well as to husk said ears. In the present invention I have illustrated elongated members or bars as the preferred form of such means. For purposes of exemplification of the invention but not by way of limitation, I prefer to utilize the means shown in my hereinbefore mentioned patent, however in order to accomplish the adaptation of said means of my former patent to the present invention, I have modified the same the better to accomplish such purpose. The pinch bars 65 are driven by the rotary movement of an upper bearing head 67. They idle in a lower bearing head 68. The arrangement of bars 66 is identical with that of bars 65. The lower ends of bars 65 and 66 have extensions 69 journaled in bearing heads 68, positioned by shoulders 70, washers 71 and nuts 72.

The bearing heads 67 and 68 are supported upon the frame of the machine, as hereinafter described, in such manner that the angle of the common axis about which each set of bars 65 and 66 revolves, and the equal angle of inclination of each bar, is not more than about twelve degrees with the horizontal and not less than about six degrees with the horizontal. If this angle of said axes is substantially greater than twelve degrees, the huskers will not be conveyed rearwardly and upwardly by the bars but, the ears of corn, unless auxiliary and complex means are provided for deflecting them laterally off the bars onto a conveyor disposed laterally with respect to the bars, will slide downwardly and forwardly of the bars, thereby either clogging the bars and/or the gatherer chains and being deposited on the ground among the stalks and leaves husked therefrom. If the angle is substantially less than six degrees it will become impossible properly to husk the ears of corn from the stalk and leaves and the bars will become clogged by said stalks, leaves and ears of corn.

Bearing heads 68 are journaled in semicylindrical retainer members 73 and 74 (Figs. 6, 8, 9 and 10), secured together by bolts 75. A groove 76 in head 68, cooperating with a rib 76a on the retainers 73 and 74 protects the bearing from dirt and also prevents the escape of lubricant which is disposed between the head and retaining members. An apertured lug 77 on each retainer 74 associated with the outside pinch bars 65 and 66 enables the retainers 73 and 74 to be pivotally connected to a bracket 78 (Figs. 2 and 9) by means of a pin 79. Bracket 78 is attached to frame members 37 and 40 by bolts 80. The retainer 74 for each inside set of pinch bars 65 and 66 is pivotally connected to a bracket 81 (Fig. 10) by a pin 82. Bracket 81 is pinned to one extremity of a shaft 83 reciprocably mounted in lugs 84 of a lever quadrant 85 one of which is bolted to each extremity of transverse frame member 43.

A hand lever 86 is pivotally mounted on quadrant 85 by a pin 89 and carries a detent 87 for cooperation with notches 88 in quadrant 85. A pin 90 is secured in shaft 83 and projects through a slot (not shown) in hand lever 86. This arrangement enables hand lever 86 to impart an axial movement to shaft 83, laterally of the machine, thus providing a lateral adjustment for the forward pinch bar bearing heads.

The rear ends of each of the pinch bars 65 and 66 has an extended obliquely mounted pin section 92 (Fig. 6) journaled in bearing head 67 and positioned by a shoulder 93, a washer 94, and a nut 95. A cap 96 with an extended hub 97 is secured by bolts 98 to head 67. Hub 97 of cap 96 is journaled in the lower end of a housing 99, and is secured to the lower end of a drive shaft 100 by a key 101, a washer 102, and a nut 103. Shaft 100 is journaled in housing 99.

A hubbed flange 104 (Fig. 12) is keyed to the upper end of shaft 100 by means of a key 105, and is held against vertical displacement by a washer 106 and a nut 107. Pins 108, oppositely disposed, are riveted to flange 104, and engage circular apertures 110 in the web of a gear 109. Oppositely disposed bolts 111 (Fig. 11) secure the web of gear 109 to flange 104. This arrangement permits timing of bars 65 and 66, by simply removing gear 109, advancing a companion gear 114, and then replacing gear 109.

The left bearing head 67 (Fig. 11) is secured to the lower end of a shaft 112 journaled in a housing 113 in the same manner as the right bearing head 67 is secured to shaft 100, using the same parts or members. A gear 114 (Figs. 11 and 13) is pinned to the upper extremity of shaft 112 and has a hub 115 with a serrated face. A sprocket 116 is reciprocably mounted upon shaft 112 directly above gear 114 and has a hub 117 having teeth thereon like, and for engaging the teeth on hub 115 of gear 114. A spring 118 is mounted upon shaft 112 and resiliently presses a collar 119 against sprocket 116 upon the hub 117 of sprocket 116. This arrangement forms a slip or safety clutch for the pinch bar drive to release the drive in the event the bars become fouled by stones or other hard foreign material. The tension of spring 118 may be varied by means of a nut 120.

An extension bracket 121, integral with housing 99 (Fig. 11), is pivotally mounted upon another extension bracket 122 by means of a pin 123. Extension bracket 122 of housing 113 is secured to frame member 24 by bolts 124, thus securing the pinch bar mechanism to the main frame.

A spring 125 (Fig. 11) is mounted upon a bolt 126 one end of which is reciprocably mounted in a lug 127 on housing 99 and the other end of which is mounted in an angle member 128 which is bolted or otherwise secured to the transverse frame member 24. Bolt 126 is positioned by its head 129, while a nut 130 and washer 131 on the bolt provide means for adjusting tension in spring 125. A second nut locks nut 130, maintaining it in any desired position.

Under the pressure of spring 125, nut 132 exerts a predetermined pressure upon lug 127 of housing 99 which is pivotally mounted upon the pin 123, thus maintaining pinch bars 65 in adjusted relation with pinch bars 66. If some incompressible object should be drawn between the two sets of pinch bars, however, spring 125 will be compressed and the two sets of bars will be forced apart freeing them from such object without injury to the bars.

A husking chamber (Fig. 15) is positioned toward the rear end of the pinch bars, and consists of two side members 133 and 134, and a presser chain 135. There is a husking unit for each complemental set of pinch bars 65 and 66, and each unit is identical except for their supports. Side members 133 and 134 for the right set of bars 65 and 66, looking forwardly from the rear of the machine, are riveted or otherwise secured to the longitudinal main frame members 17 and 34, and are reenforced at their lower edges by angle members 136 and 137 secured in any conventional manner at their forward ends to the members 37 and 38.

The rear ends of members 136 and 137 are supported by depending members 138 (Fig. 2) bolted to members 17 and 34 (Fig. 3), respectively. The side members 133 and 134 of the husking chamber for the left-hand set of bars 65 and 66 are supported by the longitudinal frame members 35 and 36. The lower reenforcing members 136 and 137 are bolted at their forward ends to the sloping longitudinal frame members 39 and 40 and are supported at their rearward extremities by members like support members 138 but not shown, attached in any conventional manner to the longitudinal frame members 35 and 36, respectively.

The presser chain 135, which serves to hold the ears snapped from the stalk in the most favorable position to be husked by the pinch bars 65 and 66, consists of a series of links in the nature of flanged plates (Fig. 15) of two different lengths, short links 140 and longer links 141. The links are flanged plates and are pivotally connected by pintles 142.

Rods 143 and 144 (Fig. 2) are mounted in the longitudinal frame members 17 and 34, and 35 and 36, and pivotally support the extremities of the chain 135 in the husking units, cooperating with pintle holes 145 at the ends of each extreme link. Removable weights 147 (Fig. 15) having circular apertures at their centers to fit over pins 148 and secured to links 141 in any conventional manner are provided as a means to vary the weight of chain 135 to meet the requirements of varied husking conditions.

Notches 149 (Figs. 5 and 6) at the rear end of the parallel portions of the pinch bars 65 and 66 render the bars more effective against the smooth surface of the husked ears when urging said ears rearwardly.

A conveyor 150 (Fig. 13) is positioned transversely of the frame behind the discharge end of the two complemental sets of pinch bars to receive the ears of corn from the bars. Conveyor 150 is of a standard continuous chain and slat type of construction. Slats 151 are riveted to projecting lugs on a detachable link chain 152. The lower flight of chain 152 is supported by hardwood slide plates 153 (Fig. 13) that are bolted to transverse angle members 154 and 155.

The right-hand extremities of members 154 and 155 (Fig. 4) are welded to the lower ends of uprights 156 and 157 which are secured to the extended portions of main frame members 15 and 16. The left-hand portions of members 154 and 155 are elevated and conventionally secured to a longitudinal member 158 bolted to main frame members 24 and 25. Additional rigidity is assured by bolting member 155 to the main frame members 24 and 30.

The upper flight of conveyor 150 is supported by hardwood slide plates 159 and 160 (Fig. 14) bolted to angle members 161 and 162. Angle members 161 and 162 are welded at their right-hand ends to uprights 156 and 157. The left extremities of members 161 and 162 are supported by uprights 163 and 164 (Figs. 3 and 4) that are bolted to the elevated ends of members 154 and 155. Sprockets 165 and 166 (Fig. 14) are pinned to a shaft 167 journaled in boxes 168 and 169 which are suitably mounted in uprights 163 and 164. Sprockets 165 and 166 drive conveyor 150 through chains 152. Idler sprockets 170 pinned to suitably journaled shafts 171 serve to guide chain 152 in a predetermined path.

Side members 154 and 155 (Fig. 13) serve to retain the husked ears in conveyor 150 while a sheet 174 secured to the same members 154 and 155 forms the bottom section.

Occasionally a section or corn stalk works its way into conveyor 150. If the stalk section protrudes beyond side members 172 or 173, attached to transverse members 154 and 155 (Fig. 16), a finger 176 riveted to one of the slats 151 (Fig. 16) urges said stalk against the cutting edge of a knife 174a suitably mounted upon plate 175 secured to side member 172. The pressure of finger 176 exerted against the stalk causes the protruding section of such stalk to be sheared off.

Husked ears carried from the husking chambers by conveyor 150 are deposited into a standard wagon elevator 177 (Fig. 4) by means of a chute 178. The support for the elevator 177 comprises two short rearward uprights 179 and 180 (Figs. 3 and 4) and two forward uprights 181 and 182 (Fig. 3) bolted to longitudinal frame members 23, 158 and 183.

Transverse support 184 is bolted to the lower ends of members 179, 180, and transverse support 185 to the lower ends of members 181 and 182. Brackets 186 are bolted to members 184 and 185 and have circular apertures to receive pins 187 that are riveted to angle supports 188. Angle supports 188 are conventionally secured to the side members of elevator 177, thus providing a support for the unit. Braces, not shown, may be used to position elevator 177 rigidly.

A power take off shaft 189 (Fig. 1) of standard construction and having a splined female connection (not shown) is adapted to cooperate with a male splined power take off shaft of a tractor by which the device is pulled. A universal joint 190 flexibly connects power take off 189 to a short drive shaft 191 journaled in bearing boxes 192 and 193 (Fig. 14). Bearing box 192 is mounted upon an upright plate 194 bolted to frame members 25 and 31. Bearing box 193 is suitably mounted in a bearing bracket 195 bolted to frame members 23 and 183.

One extremity of a transverse shaft 196 is journaled in a box 197 suitably mounted in bracket 195 while the other end of said shaft is journaled in a bracket 198 (Fig. 1) attached to longitudinal members 210, 211 and 212. A bevel pinion 199 pinned to shaft 191 drives a bevel gear 200 pinned to shaft 196. A gatherer chain drive shaft 201 is driven by shaft 196 through sprockets 202 on shaft 196 and 203 on shaft 201 and a chain 204 about said sprockets. Shaft 201 is journaled in boxes 205 and 206 mounted in plates 207 and 208 which are bolted to members 38 and 49. Sprockets 209 drive the gatherer chain drive sprockets 60 (Fig. 2) through chain 61.

The bearing bracket 198 (Fig. 1) in which shaft 196 is journaled is bolted to longitudinal angle members 210, 211 and 212. A bevel gear 213 is pinned to one end of a short shaft 214 journaled in bracket 198 and is driven by a bevel pinion 215 pinned to the end of shaft 196. A sprocket 216 is pinned to the other end of shaft 214 and drives the pinch bar drive sprockets 116 through a drive chain 217.

A pinion 218 also is pinned to shaft 191 (Fig. 14) and drives a spur gear 219 pinned to a shaft 220 which is journaled in bearing boxes 221 and 222. Box 221 is mounted upon upright plate 194 while box 222 is mounted upon a plate 223 which is bolted to frame member 24. A sprocket 224 is rotatably mounted upon shaft 220 and is driven by said shaft through a safety clutch 225 secured to shaft 220 and has a tooth flange engaging teeth on the hub of sprocket 224.

When the load on clutch 225 exceeds the normal, the spring in clutch 225 is compressed, allowing the clutch teeth to withdraw from engagement with the teeth in the hub of sprocket 224. This allows the sprocket 224 to rotate upon shaft 220, thus protecting the drive from injury. A sprocket 227 pinned to elevator drive shaft 228 is driven by sprocket 224 through a chain 226 thus providing means for driving the wagon elevator 177.

A sprocket 229 is rotatably mounted upon a shaft 230 and drives shaft 230 through a safety clutch 231. The action of safety clutch 231 is identical with that of clutch 225. Power from shaft 220 is transmitted to shaft 230 by the sprockets 228' and 229 and a chain 232. Shaft 230 is journaled in boxes 233 and 234 mounted upon members 164 and 194. A pinion 235 pinned to shaft 230 drives a spur gear 236 pinned to the drive shaft 167 of conveyor 150.

A drawbar 237 (Fig. 1) of standard design is conventionally secured to channeled members 238 and 239 bolted to the transverse frame members 25 and 31.

A tilting lever 240 is bolted to an angle member 241 which is secured to the main frame members 25 and 31. A detent at point 242 on lever 240 cooperates with a quadrant 243 bolted to drawbar 237. The lever 240 serves to tilt and maintain the frame of the machine at a predetermined angle with the ground line.

As the machine is pulled by a tractor couped to drawbar 237, the tractor power take off sets the mechanism in motion through power shaft 189 causing bevel pinion 199 to drive bevel gear 200 and thereby revolving shaft 196 to which sprocket 202 is secured. Sprocket 202 drives sprocket 203 by means of chain 204. The revolution of sprocket 203 causes shaft 201 to rotate and to revolve sprockets 209 which drive sprockets 60 through chains 61. Bevel pinions 59 which are pinned to the same shafts upon which sprockets 60 are mounted, drive bevel gears 56 whose hubs are integral with those of sprockets 55. The arrangement of bevel gears 56 and 59 is such that the sprockets 55 in revolving cause the inner courses of the gatherer chains 53 to move rearwardly and upwardly.

As the machine advances, stalks of corn are guided toward throats 51 by the cooperation of points 45 and guides or curved plates 50. Guides 244 which may be conventionally secured to extension brackets 46 serve to hold the low ears up from the surface of the pinch bars upon entering throat 51 to prevent crushing the ears. Fingers 52 of the gatherer chains 53 urge the stalks rearwardly until they are well engaged by the squeezing and pulling means.

Bevel pinion 215, attached to driveshaft 196, drives bevel gear 213 attached to shaft 214, and since sprocket 216 is also pinned to shaft 214, the action of bevel gear 213 causes it to revolve and impart power to the pinch bar drive sprockets 116 through chain 217.

Stalks progressing rearwardly contact pinch bars 65 and 66 and are pulled downwardly between said bars until they are stripped of all ears. Stalks pass through the bars downwardly while the ears that have been snapped from the stalks are carried rearwardly along the bars to the husking chamber by the linear movement of succeeding bars as they are moved by the blocks 67 and 68. Presser chain 135 holds the snapped ears close to the surface of the means which engage and strip the husks from the ears. Husked ears progress rearwardly and are deposited upon conveyor 150, and the notches 149 are useful in aiding the progress of the ears through the machine.

Pinion 218 secured to drive shaft 191 drives spur gear 219 pinned to shaft 220. Sprocket 228' secured to shaft 220 drives sprocket 229 on shaft 230 by means of chain 232. Pinion 235 also secured to shaft 230 drives spur gear 236 pinned to shaft 167. Sprockets 165 and 166 pinned to shaft 167 drive the chains 152 of conveyor 150. Chain sprocket 224 on shaft 220 imparts power to the drive shaft of wagon elevator 177.

Husked ears deposited upon conveyor 150 are urged transversely to the left side of the machine (Fig. 4), then move upwardly, and are deposited in chute 178, which guides them into the wagon elevator 177. Elevator 177 deposits the husked ears in a wagon conventionally attached alongside the machine, or into a tank or other receptacle on the machine.

It will be seen from the foregoing that corn may be harvested by passing the stalks between the opposed sets of pulling and squeezing members so that the stalk passes progressively downwardly therebetween; the ears which are relatively solid and sizable as compared with the stalks being stripped from the stalks when they reach the pulling and squeezing members. The ears so removed will be caused to travel in the longitudinal direction of the set of pulling and squeezing elements because of the longitudinal component movement of said members, at the same time the members of the cooperating sets will cause the ears to tumble thereon to a certain extent, thus aiding in loosening the husks which will be gripped between the opposing sides of said sets and stripped from the ear passing thence downwardly between the sets. My invention therefore envisages a new method of gathering and husking corn as a continuous process wherein the corn ears are squeezed from the stalks which are discharged along one path downwardly of the squeezing and pulling elements while the stripped ears are delivered or conveyed upwardly and to the rear of the machine by said elements and are husked while being so conveyed.

The invention is hereby claimed as follows:

1. In a corn picker and husker, elongated crop engaging members for snapping and husking corn and mechanism for moving said members in angular elliptical paths, said members having notches for expediting the movement of ears of corn therealong.

2. In a corn picker and husker, elongated crop engaging members for snapping and husking corn, and mechanism for moving said members in closed, curvilinear paths, said members having notches for expediting the movement of ears of corn longitudinally of said members.

3. In a corn picker and husker, elongated crop engaging members for snapping and husking corn and mechanism for moving said members in angular elliptical paths, said members having means thereon for expediting the movement of such corn along said members.

4. In a corn picker and husker, elongated crop engaging members for snapping and husking the corn, and mechanism for moving said members in closed, curvilinear paths, said members having means thereon for facilitating the conveyance of the ears of corn along said members.

5. In a corn picking and husking device, husking means comprising two sets of opposed members mounted to describe without rotating opposed angularly elliptical paths, the direction of movement of said members being downward at the adjacent sides of said sets, side members above said opposed members to prevent loss of ears of corn, and means above said members and between said side members to press ears of corn against said members for husking.

6. In a corn picking and husking device, husking means comprising two sets of opposed members, each set of opposed members being mounted for revolution about a common axis inclined at an angle of within about 6 to 12 degrees, means for revolving said sets of opposed members in opposite directions, the direction of movement of said members being downward at the adjacent sides of said sets, spaced members above said opposed members for preventing lateral movement of the ears of corn off said opposed members and means above said opposed members and between said spaced members to press ears of corn against the opposed members for husking thereby.

7. In a corn picking and husking device, guides defining a throat, means adapted to lift fallen stalks of corn and guide them into such throat, gatherer chains having fingers extending in such throat and moving in a path upwardly and backwardly along said guides, pinch bars below said gatherer chains and extending upwardly and backwardly from said gatherer chains, said bars each being inclined at an angle of within about 6 to 12 degrees to the horizontal, said gatherer chains moving stalks of corn from said throat between said pinch bars, and means for moving said pinch bars to pull the stalks and the husks downwardly while obstructing the downward passage of the ears of corn on such stalks to snap the ears from the stalks and the husks and to cause the husked ears to be conveyed backwardly by said pinch bars.

8. A corn picker and husker comprising a vehicle adapted to be moved relatively to the corn stalks, opposed picking and husking members on said vehicle and inclined at an angle of within about 6 to 12 degrees to the horizontal, means to guide stalks of corn between said opposed members, and means to move said members relatively toward and from each other for separating the ears of corn from the stalks and husks and for causing the ears to be conveyed toward the rear of the vehicle independently of the stalks and husks.

9. A corn picker and husker comprising opposed series of elongated members, means to guide stalks of corn between said members and means to move said members relatively in a manner to cause said members to pull the ears from the stalks to separate the ears from the stalks and thereafter to pull the husks from each ear, and means for holding the ears of corn to be thus husked against said members during the husking operation.

10. A corn picker and husker comprising a series of members in opposed relation, means for moving said members in opposed elliptical paths, the members in each series traveling in a common path, means to guide stalks of corn bearing ears of corn thereon between said opposed series of members and means whereby upon movement of said members the ears will be separated from the stalks and will be deposited on said members, and means to hold said ears of corn against said members whereby to cause said members to pull the husks from said ears.

11 In a corn picker and husker, elongated crop engaging members for snapping and husking the corn and mechanism for moving said members in closed curvilinear paths about a common axis inclined at an angle of within about six to twelve degrees to the horizontal to husk the ears of corn from the stalks and to convey the husked ears longitudinally of said members, said members having means thereon for additionally facilitating the conveyance of the ears of corn along said members.

12. In a corn picking and husking device, husking means comprising two sets of opposed members mounted to describe without rotating opposed angular elliptical paths, the members of each set moving about a common axis inclined at an angle of within about six to twelve degrees to the horizontal, the direction of movement of said members being downward at the adjacent sides of said sets, means for driving said sets of opposed members so as to snap and husk ears of corn from the stalks and leaves and to convey the husked ears longitudinally of said members, side members above said opposed members to prevent loss of ears of corn, and means above said members and between said side members to press ears of corn against said members for husking.

WILLIAM E. URSCHEL.